United States Patent
Labrie et al.

(10) Patent No.: US 9,158,869 B2
(45) Date of Patent: Oct. 13, 2015

(54) METHOD AND SYSTEM FOR PROPERTY DAMAGE ANALYSIS

(75) Inventors: Zachary Labrie, Broomfield, CO (US); Benjamin Zamora, Arvada, CO (US); Tim Bruffey, Commerce City, CO (US)

(73) Assignee: ACCURENCE, INC., Westminster, CO (US)

( * ) Notice: Subject to any disclaimer, the term of this patent is extended or adjusted under 35 U.S.C. 154(b) by 222 days.

(21) Appl. No.: 13/542,541

(22) Filed: Jul. 5, 2012

(65) Prior Publication Data

US 2012/0311053 A1    Dec. 6, 2012

Related U.S. Application Data

(63) Continuation-in-part of application No. 13/336,559, filed on Dec. 23, 2011, now Pat. No. 8,983,806.

(60) Provisional application No. 61/460,964, filed on Jan. 11, 2011.

(51) Int. Cl.
*G06F 17/50* (2006.01)
*G06Q 10/06* (2012.01)
*G06Q 40/08* (2012.01)

(52) U.S. Cl.
CPC ............ *G06F 17/5004* (2013.01); *G06Q 10/06* (2013.01); *G06Q 10/063* (2013.01); *G06Q 40/08* (2013.01)

(58) Field of Classification Search
CPC .............................. G06F 17/5004; G06F 17/50
USPC ............................................................. 703/1
See application file for complete search history.

(56) References Cited

U.S. PATENT DOCUMENTS

| | | | |
|---|---|---|---|
| 6,037,945 A * | 3/2000 | Loveland | 345/420 |
| 6,810,383 B1 * | 10/2004 | Loveland | 705/7.13 |
| 6,816,819 B1 * | 11/2004 | Loveland | 703/1 |
| 6,826,539 B2 * | 11/2004 | Loveland | 705/4 |
| 6,829,584 B2 * | 12/2004 | Loveland | 705/7.11 |
| 8,078,436 B2 * | 12/2011 | Pershing et al. | 703/2 |
| 8,145,578 B2 * | 3/2012 | Pershing et al. | 705/400 |
| 8,170,840 B2 * | 5/2012 | Pershing | 703/1 |
| 8,209,152 B2 * | 6/2012 | Pershing | 703/1 |
| 8,401,222 B2 * | 3/2013 | Thornberry et al. | 382/100 |
| 8,670,961 B2 * | 3/2014 | Pershing et al. | 703/2 |
| 2009/0216552 A1 * | 8/2009 | Watrous | 705/1 |

* cited by examiner

*Primary Examiner* — Aniss Chad
(74) *Attorney, Agent, or Firm* — Sheridan Ross P.C.

(57) ABSTRACT

A system and method for intelligently combining CAD, inspection, and building guideline data for intelligently setting roof facet directionality, analyzing repair and replacement decisions and estimating material, material waste and recyclables, material recycling requirements, and repair or replacement costs for building facets is described. One embodiment includes receiving digital inspection data of a building facet of a property; receiving a first layer of geographic-based guideline data; receiving a second layer of geographic-based guideline data; reconciling a conflict between guideline data of the first and second layers of guideline data to reach a resulting guideline data item; determining a repair indicator for the building facet based at least in part on the resulting guideline data item and the digital inspection data; and sending an electronic message, wherein the electronic message includes at least a portion of the digital inspection data and the repair indicator.

20 Claims, 13 Drawing Sheets

METHOD AND SYSTEM FOR PROPERTY DAMAGE ANALYSIS

PRIORITY CLAIM

The present application claims benefit as a continuation-in-part of commonly-owned nonprovisional U.S. application Ser. No. 13/336,559, entitled "Method and System for Roof Analysis," filed Dec. 27, 2011, which claims priority from commonly-owned provisional U.S. application Ser. No. 61/460,964, entitled "Method and System for Roof Analysis," filed Jan. 11, 2011, each of which is incorporated herein by reference in its entirety for all purposes.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to methods and systems for building facet analysis and applying property repair guidelines to that analysis. In particular, but not by way of limitation, the present invention relates to systems and methods for intelligently creating a set of guidelines and applying it to a building repair analysis to ensure building codes and other construction requirements and building repair waste requirements are met. Additionally, it relates to systems and methods for using aerial CAD data, insurance and building code guidelines, weather data, and inspection data for intelligently making repair decisions for building facets.

BACKGROUND OF THE INVENTION

In the homeowner's insurance industry, carriers face costly exposure to inaccurate payments, lawsuits, reduced business, and lost shareholder value due, in part, to adjusters' inconsistent and inaccurate methods of inspection, data gathering, and reporting. Furthermore, carriers miss significant opportunities to collect statistical and quantitative analytics that provide effective cost controls and much needed intelligence.

Estimating software products, such as Xactware, MSB, Symbility, and the like, have roof sketching tools that enable users to draw a roof themselves. However, these tools have limited functionality. Aerial CAD companies, such as Eagle-View, Precigeo, Geoestimator, and the like, can provide information about roof facet line types and roof facet directionality. Using either of these current types of tools, a user must determine, based on the limited information available, which roof facets and roof facet lines to replace. Using the limited, and often inaccurate data, the user must also determine the roof facet area quantities and roof facet line quantities that to replace. Furthermore, users make decisions about whether to replace or repair each roof facet or line based on the limited and often inaccurate data. Some current tools make use of inspection data input by a user to assist in the analysis. However, again that data can be suspect because it is subject to the user's interpretation and the interpretation is based on a limited quantity and quality of data.

For example, storms that cause wind and hail damage to buildings are directional. Therefore roof facets on the same roof have varying degrees of damage. This makes a repair vs. replace analysis and estimating repairs for a building subjected to directional storm difficult. Consequently, errors occur in estimating repair and replacement costs, the amount of materials required, and the amount of resulting waste material. More important, errors occur in determining whether fixing a facet or line requires a repair or replacement or whether it requires fixing at all. Pricing tools also exist to assist in determining labor and material costs for repair or replacement. Again, however, those tools have limited functionality and operate on incomplete or potentially inaccurate data.

In using existing tools, a user must select which roof facets to include in the roofing material installation. The user uses the individually calculated roof facet area quantities or the summed roof facet area quantities and adds a waste amount to the quantities after the fact. The waste amount that users add is meant to pay for the partial shingles that cannot be used in the installation and sometimes the ridge caps and starter strips. The added waste amount often ranges anywhere from eight to twenty-five percent. The waste amount is either a predetermined amount set by a guideline, for example an insurance guideline, or a user's judgment call based on the roof's structure or the material required.

Moreover, multiple, conflicting requirements or guidelines may apply to the property, thus introducing further complexity in the repair analysis. Current building code rules are created by the International Code Council (ICC). Local municipalities choose which code books that they want to follow. The municipalities adjust and augment the ICC codes for their local area. In the United States alone, there are about 80,000 municipalities. Consequently, it is difficult for insurance companies and roofing contractors to determine which municipalities a home is within and what the building codes are for those municipalities. The same issues apply in other countries as well.

Many different types of building materials are used today and oftentimes are difficult to identify by insurance adjusters or contractors. For roofing material, sample shingles from the property must be sent offsite for analysis to determine the manufacturer and shingle type so that a proper repair or replacement can be completed. This analysis takes time and the full determination of cost must wait for the analysis to be complete.

Further, even before an adjuster or contractor is onsite to inspect or repair damage, a homeowner or property owner may have no idea if the property is damaged. And after damage-causing events, contractors often try to generate business by going door-to-door in potentially-damage-affected areas. Because a property owner likely does not know whether the property is damaged, the property owner will not know whether to trust the visiting contractor. Indeed, without having been able to inspect the property, even the contractor will not know whether the property is damaged.

Although present devices and systems are functional, they are not sufficiently accurate or otherwise satisfactory. Accordingly, a system and method are needed to address the shortfalls of present technology and to provide other new and innovative features. What is needed is a system and method for combining available data for providing accurate repair vs. replacement analysis and material and cost estimation. In particular, a system and method is needed to scientifically calculate, based on disparate data sources and particular installation procedure requirements as described above, the actual amount of building material required for installation. Further, a system or method is needed for intelligently deciding which building facets are in need of replacement or repair because current solutions based on disparate data sources such as inspection data, including weather data, insurance guidelines, and building codes. Additionally, a system or method is needed for accurately and quickly determining the amount and type of building material required for a repair or replacement, the amount of waste that will be generated, and the amount of waste that can be recycled.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide systems and methods for intelligently combining CAD, inspection, and building guideline data for intelligently setting roof facet directionality, analyzing repair and replacement decisions and estimating material, material waste, and repair or replacement costs and requirements for building facets.

Onsite, an adjuster typically will use a smart paper form and digital pen to capture inspection data. In an exemplary embodiment, the digital inspection data from the adjuster is uploaded to an analysis engine which can validate and analyze the data using predetermined business rules; enforce compliance with carrier guidelines and local rules; complete calculations; create a digital three-dimensional model of the property; prepare a scope of repair; and send information, for example, in an XML file, to an estimating vendor to automatically deliver a pre-qualified estimate to the adjuster. Because all of the necessary data and guidelines are integrated by the system and method, an estimate can be delivered approximately in real-time. For example, the estimate can be delivered within 90 seconds given a full set of predetermined rules and guidelines. In other embodiments, an estimate can be delivered approximately in real-time after user input to the analyses.

Exemplary systems and methods in accordance with the present invention can collect CAD data from aerial CAD providers and inspection data from the onsite user. Some examples of CAD data from aerial CAD providers included points, lines, line types, roof facet degrees, roof facet pitch, roof facet size, and the like. Some examples of inspection data include hail hit frequency, wind damaged data, building material, building material type, building material age, and the like.

Building material type can include the type of building material that comprises the building facet or building facet line, for example shingle, siding, decking, shield, drywall, insulation, and the like. Building material type can also include other information concerning a building facet or building facet line, for example, whether the building material type is exposed, partially exposed, exterior, interior, layered, and the like. Building material can include the material of which the facet components are built, for example wood shingle, asphalt shingle, clay roof tiles, metal gutter, fiberglass gutter, gypsum drywall, vinyl siding, aluminum siding, wood siding, and the like. Embodiments can accommodate multiple building materials and building material types. Further, some embodiments can enable user input building material and building material types to further refine the repair indicator decisions.

Some embodiments can use both types of data, along with others such as regional, local, or other insurance guidelines and local or other building codes, to make a replacement or repair decision for each building facet. Further, exemplary systems and methods in accordance with the present invention can assign to each building facet a resulting replacement decision. Exemplary systems and method in accordance with the present invention can determine the amount of building material required for each building facet based on the size of the material, installation requirements, rules, and guidelines, and building facet characteristics. Some embodiments can adjust the area of building material installation to match the installation requirements, rules, and guidelines. In some embodiments, a building material pattern is created and a building facet is superimposed on it to identify the building materials needed for installation. Wholly- and partially-used building materials are identified, and partially-used roofing materials are reused on other building facets. Actual building material use and waste are calculated. Exemplary systems and methods in accordance with the present invention can be configured to handle variable aspects of roofing material installation including roofing material types, processes, rules, partial building materials, and building material waste.

Furthermore, because aerial CAD data and weather data can be used to analyze damage and repair requirements, some embodiments can determine the likelihood that a particular property or properties in a particular area are damaged. An exemplary system can apply data related to a damage-causing event to aerial CAD data of a property in the affected area to determine which facets of the properly may be damaged, the likelihood of damage to those facets, estimate damage costs, and the like. Moreover, an exemplary system can determine the number of adjusters that should be deployed to the area to contact property owners; contact property stakeholders, such as the property owner, the property owner's insurance agent, local authorities, and the like about the potential damage; and determine information about the materials, suppliers, material manufacturers, contractors, and the like required for the potential property repair. An exemplary system can perform the property repair analysis before any adjusters, contractors, inspectors, or others who assess damage or normally contact property owners regarding the potential damage In one exemplary embodiment, the present invention can include a method for property repair analysis, comprising receiving digital building facet data for a first building facet of a set of one or more building facets; receiving digital inspection data for the first building facet; determining the amount of building material required to repair damage to an area of the first building facet; determining a repair indicator for the first building facet; wherein the determining a repair indicator is based at least in part upon the digital facet data for the first building facet and the inspection data for the first building facet; and displaying an electronic image of the set of one or more building facets.

The method may be implemented on a computer equipped with memory, processor, user-interface peripheral devices including a display, storage media devices, and network communications interfaces. The invention also provides a tangible digital storage medium embodying machine-readable instructions executable by a computer, where the instructions implement the method.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1A:
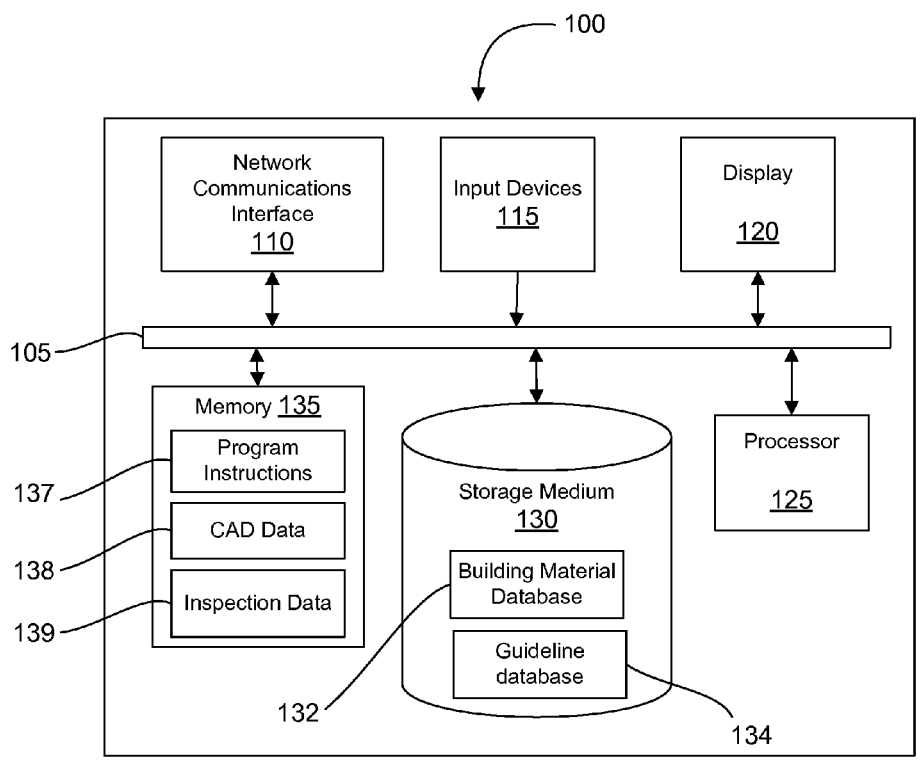
FIG. 1A shows a functional block diagram of a computer equipped with a building facet analysis application in accordance with an illustrative embodiment of the invention.

Referring now to the drawings, where like or similar elements are designated with identical reference numerals throughout the several views, and referring in particular to FIG. 1A, it illustrates a functional block diagram of a computer 100 in accordance with an illustrative embodiment of the invention. In FIG. 1A, processor 125 communicates over data bus 105 with input devices 115, display 120, network communications interface 110, storage medium 130, and memory 135. Though FIG. 1A shows only a single processor, multiple processors or a multi-core processor may be present in some embodiments. Input devices 115 include, for example, a keyboard, a mouse or other pointing device, or other devices that are used to input data or commands to computer system 100 to control its operation. Network communications interfaces 110 may include, for example various serial or parallel interfaces for communicating with a network or one or more peripherals.

Memory 135 may include, without limitation, random access memory (RAM), read-only memory (ROM), flash memory, magnetic storage (e.g., hard disk drive), optical storage, or a combination of these, depending on the particular embodiment. In FIG. 1A, memory 135 includes program instructions 137, which process CAD data 138 and inspection data 139. Database 130 includes building materials database 132 and guideline database 134 for the storage of building materials information and guidelines to apply during the property repair analysis. It should be understood that the organization of storage shown in FIG. 1A is the illustration of one embodiment and that other organization schemes or storage mechanisms or schemes can be utilized.

In one illustrative embodiment, program instructions 137 are implemented as software that is executed by processor 125. Such software may be stored, prior to its being loaded into RAM for execution by processor 125, on any suitable computer-readable storage medium such as a hard disk drive, an optical disk, or a flash memory (see, e.g., storage medium 130). In general, the functionality of program instructions 137 may be implemented as software, firmware, hardware, or any combination or sub-combination thereof.

In the illustrative embodiment shown in FIG. 1A, network communications interface 110 can be used to receive CAD data 138 and inspection data 139. For example, CAD data 138 can be received from a provider of aerial CAD data. Similarly, network communications interface 110 can receive inspection data 139.

Figure 1B:
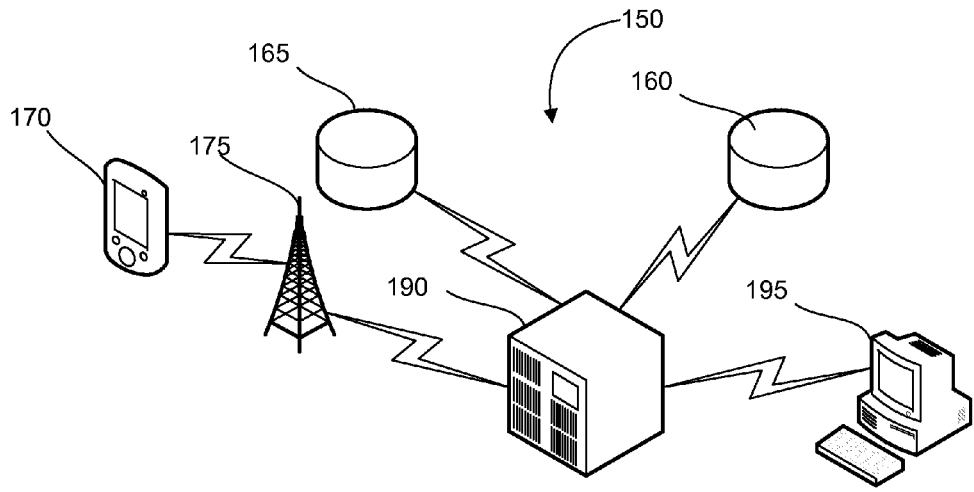
FIG. 1B shows a schematic of a network system implementing a building facet analysis application in accordance with an illustrative embodiment of the invention.

Referring now to FIG. 1B, it illustrates a system 150 in accordance with an exemplary embodiment of the invention. In FIG. 1B computer 195, which can be similar or identical to computer 100, communicates with a server 190 which receives digital building facet data from an aerial CAD provider database 160 and repair guideline data from a guideline database 165. Such repair guideline data can be provided by, for example, insurance carriers. Digital building facet data can be received from some other source that provides dimensional building facet data, directional building facet data, and other building facet data. In some embodiments, additional data sources can provide building facet data, guideline data, or both. Further, databases 160 and 165 and other data sources can be combined or further separated data sources from which data is received. Inspection data can be received via a communications network 175 from onsite inspection data captured by portable inspection device 170. Other data received by computer 195 can include building code requirements. Portable inspection device 170 can be a PDA, smartphone, laptop, or other hardware configured to capture inspection data for transmission to server 190 and computer 195. For example, portable inspection device 170 can include specialized hardware and/or software for capturing inspection data. In other embodiments, portable inspection device 170 can be replaced by some other computing device used by an insurance adjuster or other person to enter or capture inspection data. For example, an insurance adjuster may manually capture inspection data by manually taking notes or filling out a form in hardcopy and then later transferring that data, either manually (e.g., data entry) or automatically (e.g., scanning, data transfer), to another computing device. In some embodiments, server 190 can be configured to receive inspection data from portable inspection device 170.

In some embodiments, computer 195 can be a portable computer or device. For example, portable inspection device 170 can implement the functions and structure of computer 195 necessary to embody a portion of an embodiment of the invention, including receiving data, for example from databases 160 and 165. Such a device can be useful so that estimations can be produced onsite at the inspection. Those of skill in the art can appreciate that computer 195 can be implemented as a laptop, tablet computer, PDA, smart phone, or other portable device or a personal computer, minicomputer, mainframe computer, or other non-portable device. Furthermore, some embodiments can include a computer 195 that receives data directly rather than through a server 190 or some other device. Likewise, in one embodiment, portable inspection device 170 can communicate directly to computer 195.

Figure 2:
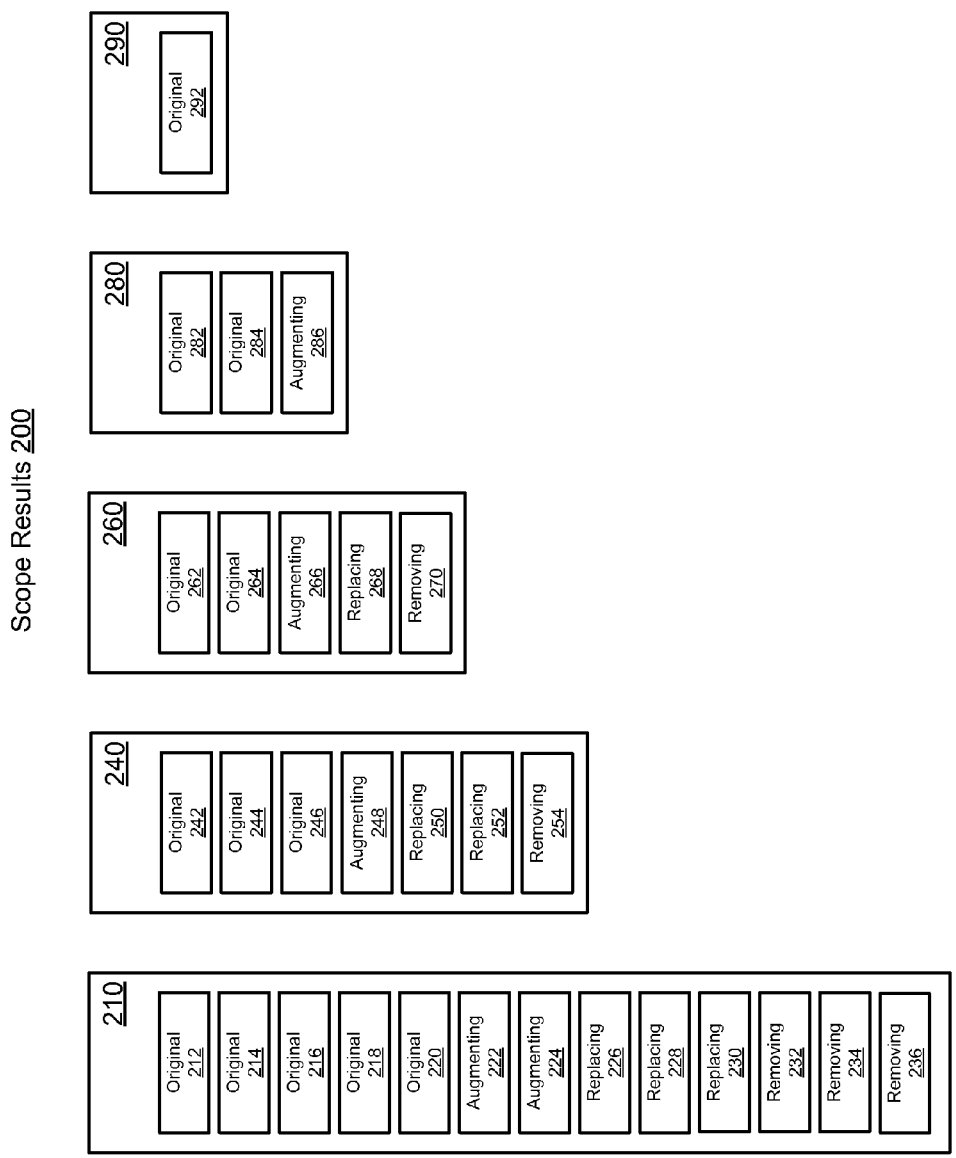
FIG. 2 shows an exemplary version of a scoping guideline item sets in accordance with illustrative embodiments of the invention.

Referring now to FIG. 2, a schematic of guideline items to be applied to a particular property is shown, including national-level scope guideline items 210, state-level scope guideline items 240, city-level scope guideline items 260, zip-code-level scope guideline items 280, and user-defined scope guideline items 290. It is to be understood that other embodiments can use guideline items scoped at different levels. For example, other embodiments can include county-level, region-level, district-level (i.e., city district, historic district, county district, etc.), and the like. In the embodiment shown in FIG. 2, national-level guideline items 210 includes several guideline items, including original guideline items 212-220, augmenting guideline items 222-224, replacing guideline items 226-230, and removing guideline items 232-236. Original guideline items 212-220 are guideline items which apply to all property repair decisions on a national level by default.

Typically, such national-level guideline items will be based on rules set by an insurance carrier or some other decision-making body. Additionally, such national-level guideline items can be based on rules set according to industry best practices or some other metric and adopted by an insurance carrier or other entity setting repair decision guidelines or rules. It is to be understood that in some embodiments, guidelines or rules can be derived from various sources. An original guideline item has a property-repair-analysis guideline or rule that, by itself, when applied to damage and inspection data, governs at least a portion of the outcome of a property repair analysis or at least a portion of the property repair analysis leading to the outcome.

In various Figures and their accompanying text, reference is made to guideline items in the scoping of guideline sets to be applied to a property repair analysis. It is to be understood that in some embodiments, guideline items are derived from raw guideline or rule data or other guideline or rule data received from a guideline or rule source. While in other embodiments, raw guideline or rule information can be scoped to determine applicable guidelines or rules to be applied in the analysis. Accordingly, in reference to various figures described, some embodiments may use raw guideline or rule data and other embodiments may user derived guideline or rule data, such as the guideline items described herein. Furthermore, the terms guideline and rule generally refer to criteria used in determining outcomes in a property repair analysis and may be used interchangeably.

In an exemplary embodiment, from the bottom up, each level undergoes item compression where items are augmented, replaced, and removed. The items resulting are then compressed with the items at the level above until the top level is reached. In the embodiment illustrated in FIG. 2, the levels start at national-level and progress down to a user-defined area. As a result of this compression, items at the more local levels will take precedence over the levels below. For example, city-level guideline items win over national-level guideline items where collisions occur. In other embodiments, other characteristics can determine precedence. For example, a different precedence order can govern items based on source. In that instance, local building codes can take precedence over insurer guidelines which can take precedence over ICC codes. In other embodiments, guideline items and thus item precedence can be based on property type, material type, rule or guideline strictness, some other characteristic, or a combination of characteristics. For example, insurer guidelines at a national level, insurer guidelines at a state level, insurer guidelines at a local level, and a county building code may all apply to a property. The insurer local guidelines can be stricter than the local building code. As a result, the insurer local guidelines can take precedence over the country building code which can take precedence over the insurer state guidelines which can take precedence over the insurer national guidelines.

In yet other embodiments, guidelines can include a time or time range which can be compared to the age of the property or the time of the event causing damage to the property. For example, a guideline item can be set to expire with another guideline item to take effect and, depending on the time of repair, analysis, time of damage-causing event, or some other time, one guideline item can take precedence over the other. In yet another embodiment, a guideline can have a time range during which it can take precedence over other, related guidelines.

Augmenting guideline items 222-224, replacing guideline items 226-230, and removing guideline items 232-236 similarly apply to all property repair decisions on a national level by default. However, augmenting guideline items 222-224, replacing guideline items 226-230, and removing guideline items 232-236 serve other purposes. Augmenting guideline items in general are secondary guideline items which serve to augment other guideline items. Replacing guideline items in general are secondary guideline items which serve to replace, under certain circumstances, other guideline items. And removing guideline items are secondary guideline items which serve to remove, or delete, other guideline items. Each type of secondary guideline items explained in further detail below.

Guideline item set 240 includes guideline items at the state level for which guideline items 242-254 apply to property repair decisions for properties within a particular state. Because guideline item set 240 is more localized than guideline item set 210, the guideline items of guideline item set 240 take precedence over the guideline items of guideline item set 210. Like national-level original guideline items 212-220, state-level original guideline items 242-246 apply by default and are typically set in a manner similar to national-level original guideline items. However, because the guideline items of guidelines set 240 are at the state level, different decision-making bodies may set them. In general, augmenting guideline item 248, replacing guideline items 250-252, and removing guideline item 254 serve similar purposes as augmenting guideline items 222-224, replacing guideline items 226-230, and removing guideline items 232-236, respectively. Likewise, each type of secondary state-level guideline item is explained in further detail below.

Guideline item set 260 includes guideline items at the city level for which guideline items 262-270 apply to property repair decisions for properties within a particular city. Again, the guideline items 262-270, being at a more localized level take precedence of the guideline items of guideline item sets 210 and 240. Similarly, guideline item set 280 includes guideline items at further localized level—zip code—which take precedence over the guideline items of guideline item sets 210, 240, and 260. Finally, the example of FIG. 2 includes guideline item set 290 which includes a guideline item 292 that is user-defined and which takes precedence over all other guideline items in sets 210, 240, 260, and 280.

User-defined guideline items can be based on latitudinal and longitudinal information. For example, a user-defined guideline can be applied where a property lies within a predetermined distance from a particular latitude and longitude. In another embodiment, a user-defined guideline item can be applied when a property lies within an area defined by latitudinal and longitudinal coordinates. Such area can be triangular, rectangular, some other regular area, or some irregular area. Moreover, such an area can be larger or smaller than the areas to which other guideline item sets apply. For example, the area can be larger than a city or zip code for which another guideline item set applies. User-defined guideline items also can be based on other geographic or other types of criteria as described herein. Furthermore user-defined guideline items can simply be generally set such that no defined criterion serves as a basis for the guideline. For example, an insurance carrier may have a repair guideline or rule that applies to all types of properties regardless of the property location or any other property characteristic.

It is to be understood that the order of precedence of guideline item sets can differ. For example, user-defined guideline item sets can be placed elsewhere within the precedence order such that its guideline items take precedence over state-level guideline items, but not city-level guideline items. In other embodiments, a zip-code-level guideline item set can take precedence over a city- or state-level guideline item set. In yet other embodiments, the order of precedence can be adjusted based on the guideline item sets or guideline items to be applied, location of the property, or user preference.

It is also to be understood that in the embodiment shown in FIG. 2 the guideline item sets 210, 240, 260, 280, and 290 can have more, fewer, or no guideline items; more, fewer, or no original guideline items; or more, fewer, or none of each type of secondary guideline item. For example, guideline item set 240 could include no original guideline items, guideline item set 260 could include no augmenting guideline items, or guideline item set 280 could have more total guideline items than guideline item set 210. The guideline item sets 210, 240, 260, 280, and 290 and their configurations are for illustration purposes only and should not be considered limiting.

Figure 3:
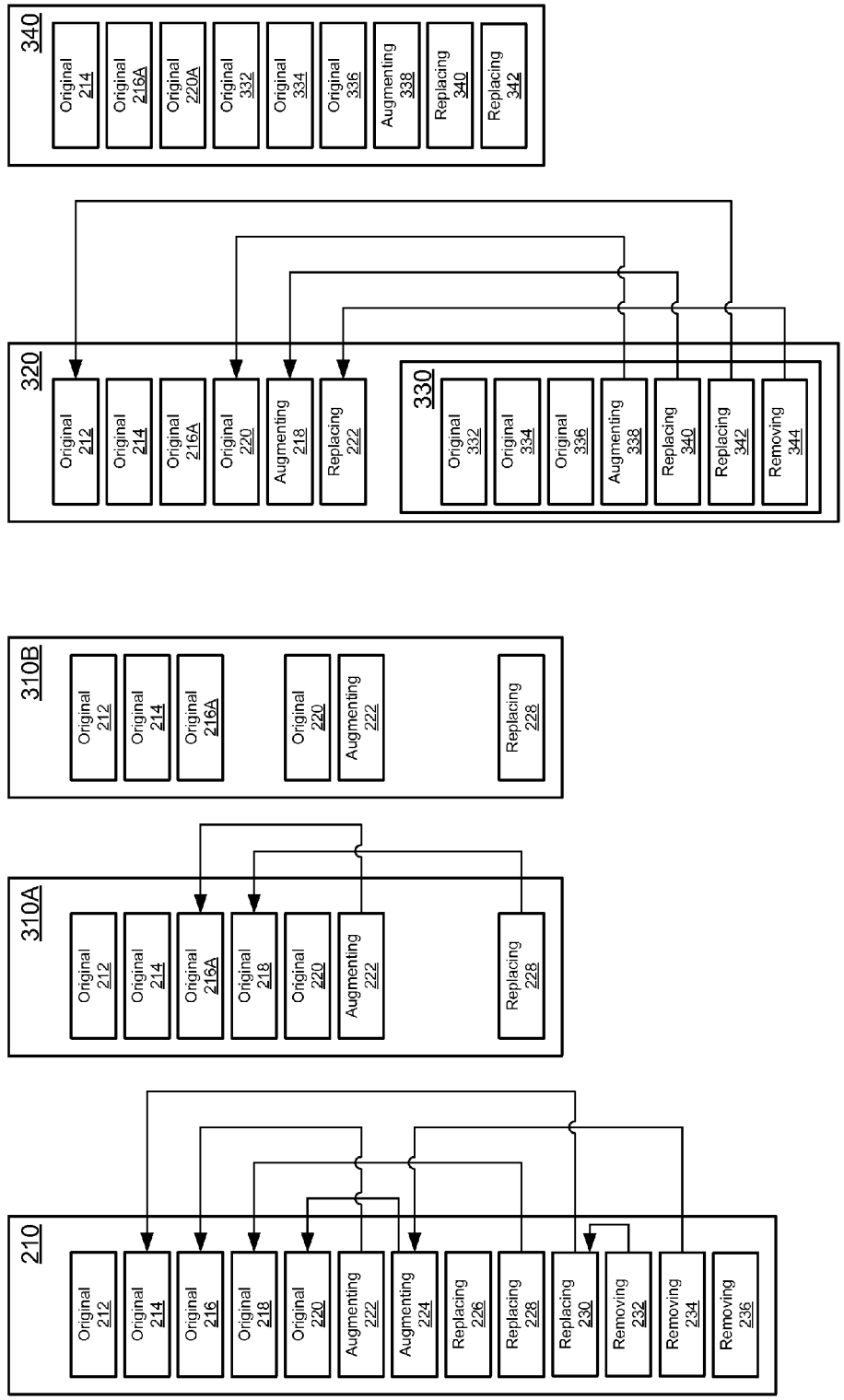
FIG. 3 shows an example of scope compression of guideline items in accordance with illustrative embodiments of the invention.

Referring now to FIG. 3, an example of scope compression of guideline items is shown. Specifically, national-level guideline item set 210 includes original guideline items 212-220, augmenting guideline items 222-224, replacing guideline items 226-230, and removing guideline items 232-236. Augmenting guideline item 222 is configured to augment original guideline item 216. Augmenting guideline item 224 is configured to augment original guideline item 220. Replacing guideline item 228 is configured to replace original guideline item 218. Replacing guideline item 230 is configured to replace original guideline item 214. Removing guideline item 232 is configured to remove replacing guideline item 230. And removing guideline item 234 is configured to remove augmenting guideline item 224. In this example, the resulting intermediate guideline item sets 310A and 320B are derived as follows. Removing guideline item 232 removes replacing guideline item 230 from the guideline item set 210. Consequently, original guideline item 214, which replacing guideline item 230 was configured to replace, remains unchanged and replacing guideline 230 is removed. Removing guideline item 234 removes augmenting guideline item 224. Consequently, original guideline item 220, which augmenting guideline item 224 was configured to augment, also remains unchanged and augmenting guideline item 224 is removed. Neither replacing guideline item 226 nor removing guideline item 236 have corresponding guideline items to affect and therefore are ignored. The intermediate result is guideline item set 310A, now missing augmenting item 224, replacing guideline items 226, 230, and removing guideline item 236 as well as removing guideline items 232-234, which have been compressed. Augmenting guideline item 222 is used to augment original guideline item 216. As a result, guideline item 216A includes the original guideline item 216 with augmented parameters from guideline item 222. Lastly, replacing guideline item 228 replaces original guideline item 218. The intermediate result is guideline item set 310B, now missing original guideline item 218.

Guideline item set 320 includes the resulting national-level guideline item set 310B and state-level guideline item set 330 in which augmenting guideline item 338 is configured to augment original guideline item 214; replacing guideline item 340 is configured to replace augmenting guideline item 218, replacing guideline item 342 is configured to replace original guideline item 212, and removing guideline item 344 is configured to remove replacing guideline item 222. Guideline item set 340 shows the resulting guideline item set after the national-level and state-level guideline items are compressed. National-level original guideline item 212 has been replaced by state-level replacing guideline item 342. National-level original guideline item 216A remains unchanged. National-level original guideline item 220 has been augmented by state-level augmenting guideline item 338 to create guideline item 220A. State-level original guideline items 332-336 are also included in guideline item set 320. In the example shown, state-level original guideline items 332-336 are guideline items that apply at the state level and do not have corresponding national-level guideline items for repair analysis and decision. National-level augmenting guideline item 218 has been replaced by state-level replacement guideline item 340. In the embodiment shown in FIG. 3, guideline item set 340 includes the guideline items that would apply to the property for which the property repair analysis is done.

Figure 4:
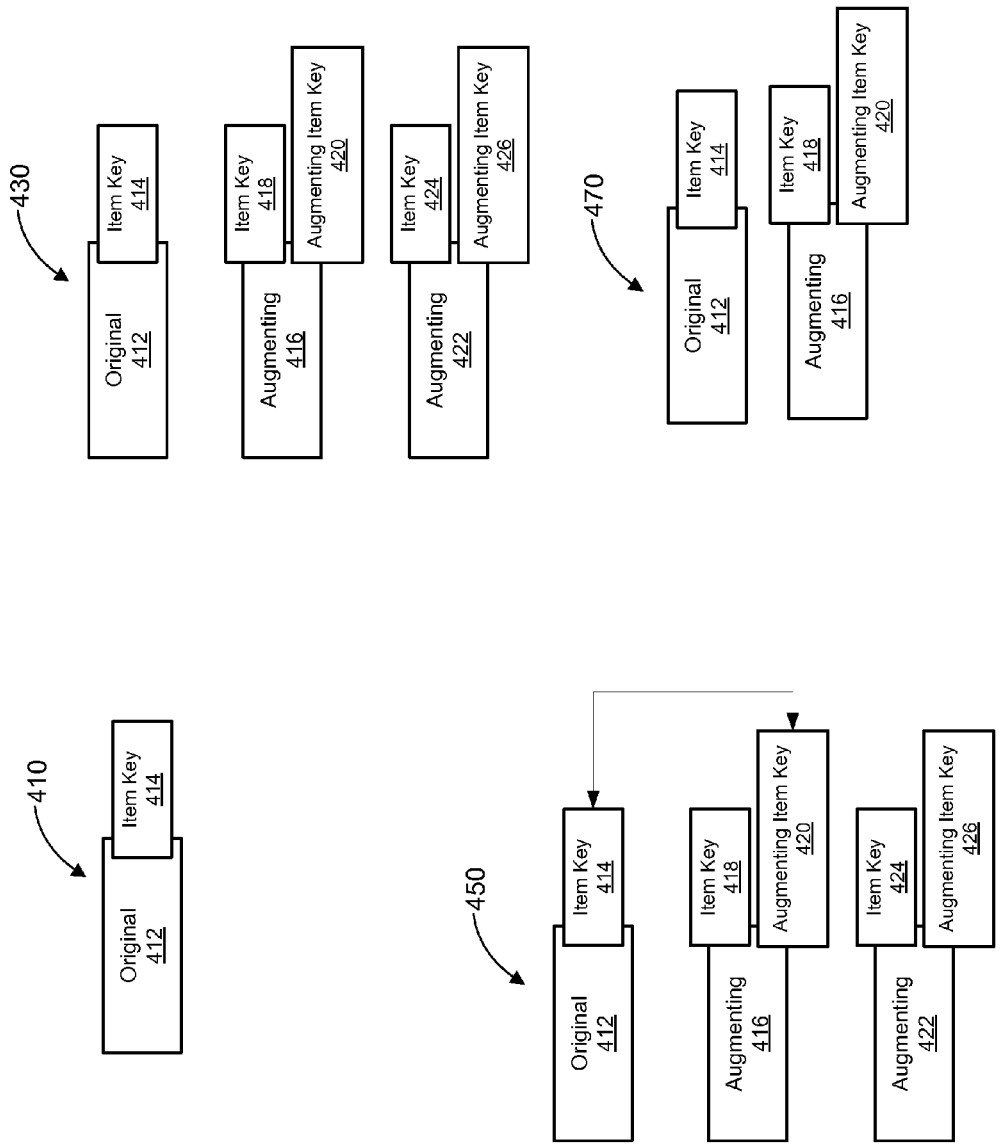
FIGS. 4-9 show exemplary versions of the compression of scoping guideline item sets in accordance with illustrative embodiments of the invention.

Referring now to FIG. 4, an embodiment of basic item augmentation is shown. At stage 410 is shown original guideline item 412 which includes identifying item key 414. In the embodiment shown, original guideline item 412 and other guideline items are stored as records in a guideline database 134 as shown in FIG. 1A. At stage 430, augmenting guideline items 416 and 422 with their respective item keys 418 and 424 and augmenting item keys 420 and 426 are placed in a list of scope guideline items within a guideline item set similar to guideline item set 210 shown in FIG. 2, guideline item set 320 shown in FIG. 3, or some other guideline item set. At stage 450, the scoping engine analyzes the item keys and augmenting item keys for the guideline items and finds that augmenting item key 420 matches item key 414. Some secondary guideline items can lack matching items to replace, remove, or augment.

Depicted at stage 450 is augmenting guideline item 422 which includes augmenting item key 426 which does not match another guideline item. In this case, augmenting guideline item 422 will be removed from the guideline item set, as shown at stage 470. In the embodiment shown, the resulting guideline item set includes original guideline item 412 and augmenting guideline item 416 which includes or references guideline logic that augments the guideline logic of original guideline item 412. Although FIG. 4 shows an embodiment in which an original guideline item is augmented, it should be understood that any type of guideline item, including replacing, removing, or augmenting guideline items can also be augmented.

Figure 5:
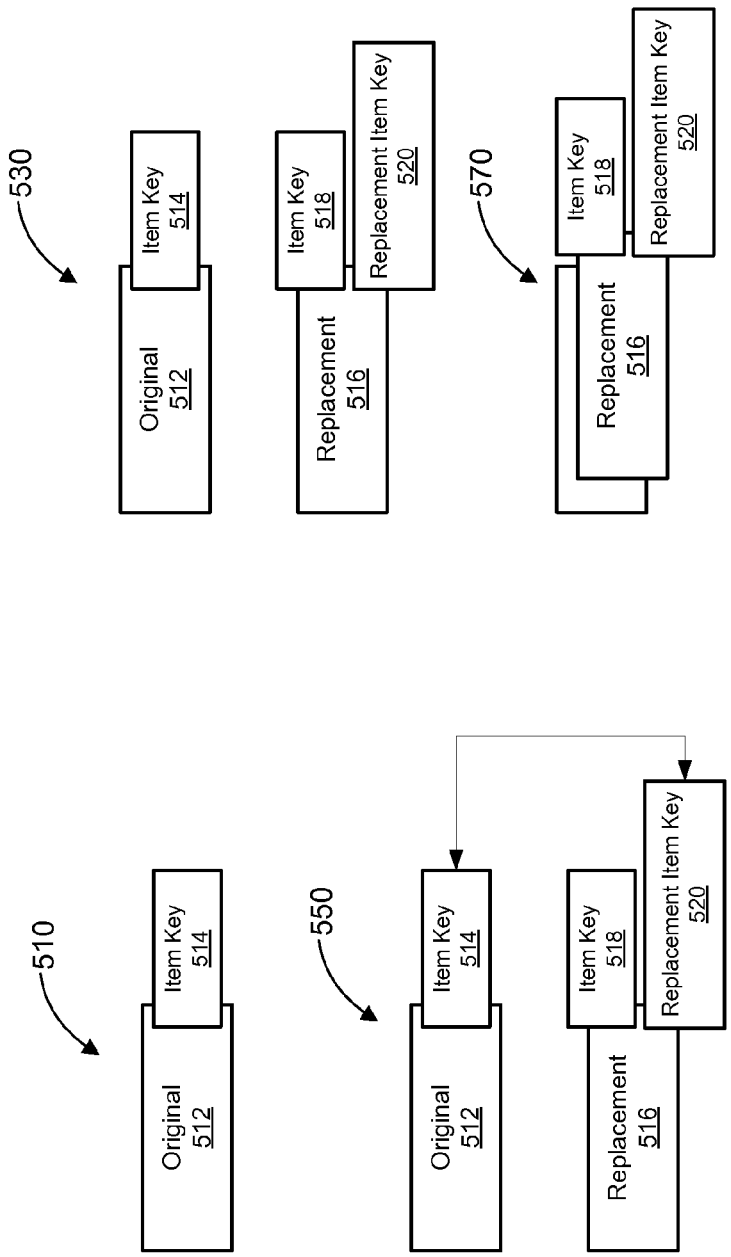

In FIG. 5 is shown an embodiment of basic guideline item augmentation. At stage 510 is shown original guideline item 512 which includes item key 514. In the embodiment shown, original guideline item 512 and other guideline items are stored as records in a database, similar to database 132 shown in FIG. 1A. Item key 514 is used as a record key to identify the record for original guideline item 512. At stage 510, original guideline item 512 is placed in the list of guideline items for a guideline item set.

At stage 530 replacement guideline item 516 is placed in the list of scope guideline items similar to stage 430 from FIG. 4 described above. Replacement guideline item 516 includes item key 518 and replacement item key 520. At stage 550 the scoping engine analyzes the keys within each guideline item. In the embodiment shown, the scoping engine will find that replacement item key 520 matches item key 514 indicating that replacement item guideline 516 should replace original guideline item 512. At stage 570 is shown the resulting guideline—that original guideline 512 is replaced by replacement guideline item 516. In this embodiment, the scoping engine compares replacement item key 520 with the item keys that identify other guideline items, including item key 514. In this embodiment, the scoping engine finds a match between item key 514 and replacement item key 520.

Figure 6:
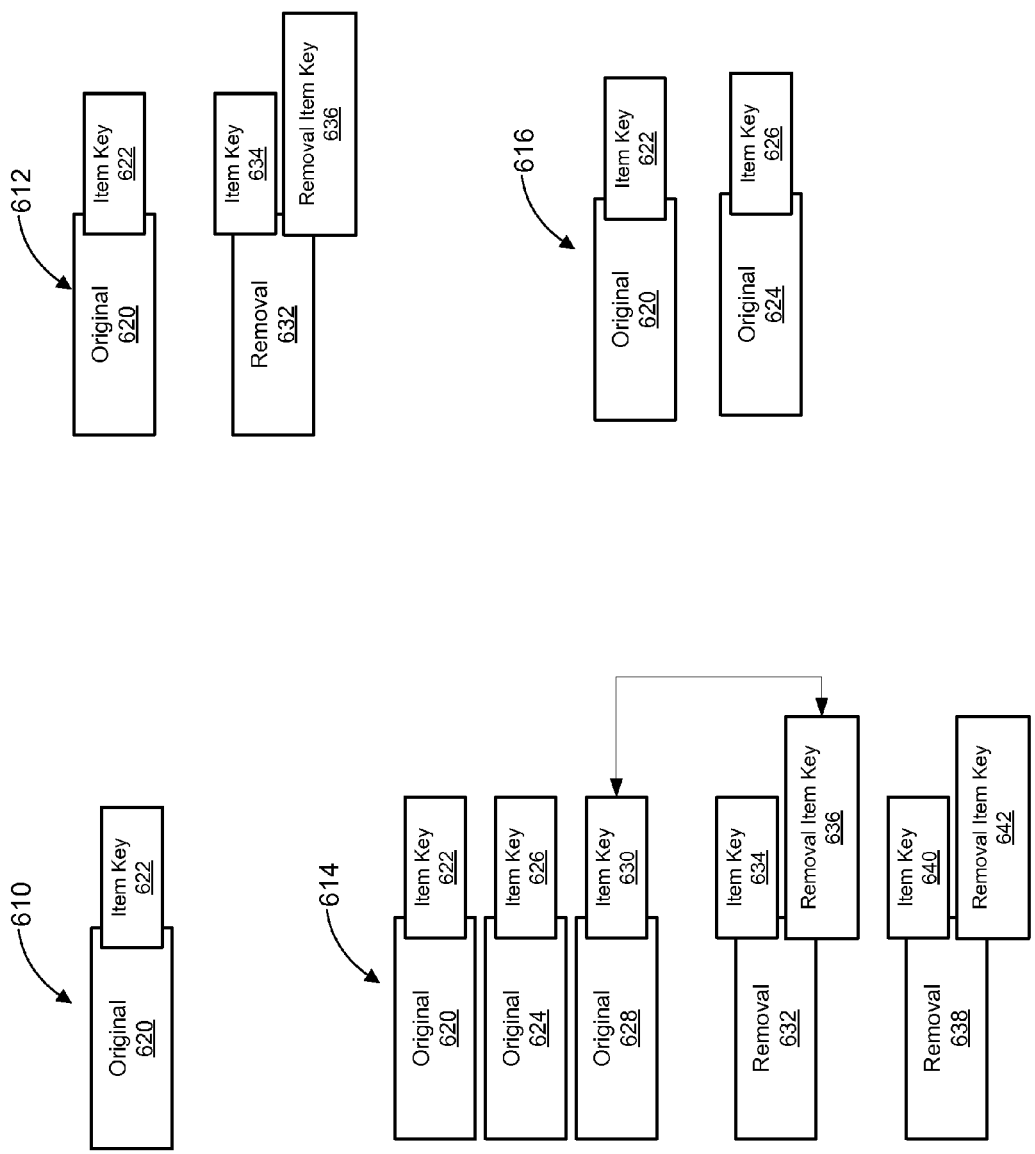

Referring now to FIG. 6, an embodiment of basic item removal is shown. At stage 610, original guideline item 620 is placed in a scoping guideline item set. Original guideline item 620 has an identifying item key 622. At stage 612, removal guideline item 632 is placed in the same scoping guideline item set. Removal guideline item 632 includes an identifying item key 634 and removal item key 634. The scoping engine will find other guideline items with item keys that match removal item key 634 to determine whether those other guideline items should be removed from the guideline item set.

At stage 614, other original guideline items 624 and 628 are added to the same scope guideline item set. Original guideline items 624 and 628 include identifying item keys 626 and 630, respectively. Also added to the same scope guideline item set is removal guideline item 638 which includes identifying item key 640 and removal item key 642. The scoping engine finds guideline items that have item keys that match removal item keys 636 and 642 and that should be removed. In this example, item key 630 matches removal item key 636 and no item key matches removal item key 642. As a result, original guideline item 628 will be removed, removal guideline item 632 will be removed because it will no longer serve a purpose after having caused the removal of original guideline item 628, and removal guideline item 638 will be removed because it also will no longer serve a purpose. Stage 616 illustrates the resulting guideline items: original guideline items 620 and 624. Also, if any of the removal guideline items had removal item keys for which no identifying item key was found, those non-matching removal guideline items would be removed from the scoping guideline items set.

Figure 7:
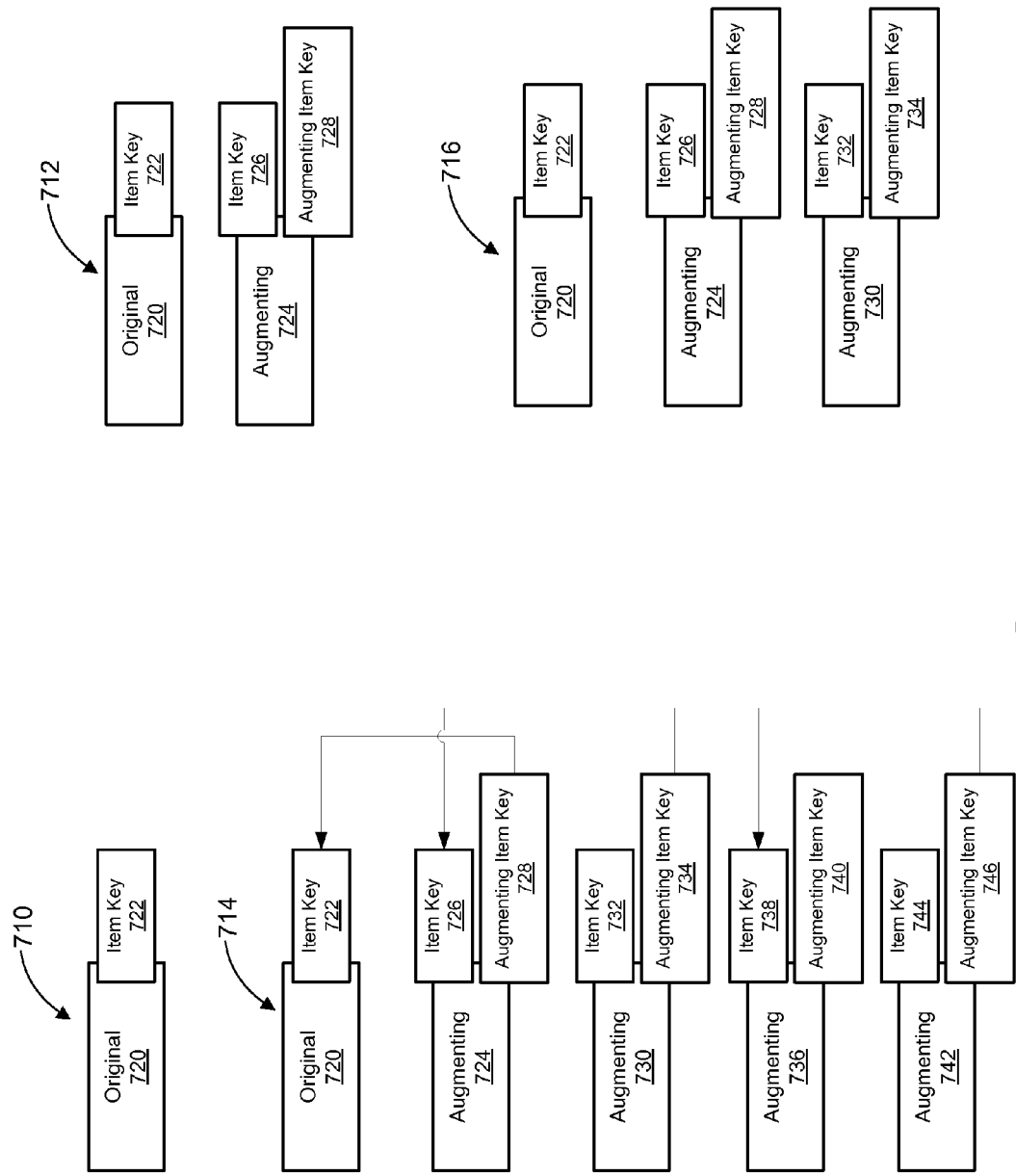

In FIG. 7 is shown an embodiment of chained item augmentation. At stage 710 original guideline item 720 with identifying item key 722 is placed in a scoping guideline item set. At stage 712, augmenting guideline item 724 with identifying item key 726 and augmenting item key 728 is placed in the same scoping guideline item set.

At stage 714, additional augmenting guideline items are included in the same scoping guideline item set. Augmenting guideline item 730 with identifying item key 732 and augmenting item key 734, augmenting guideline item 736 with identifying item key 738 and augmenting item key 740, and augmenting guideline item 742 with identifying item key 744 and augmenting item key 746 are included in the same scoping guideline item set. The scoping engine compares augmenting item keys 728, 734, 740, and 746 with item keys 722, 726, 732, 738, and 744 of other guideline items. In the embodiment shown, the scoping engine finds that augmenting item key 728 matches item key 722, augmenting item key 734 matches item key 726, and augmenting item key 746 matches item key 738. The scoping engine finds that each of augmenting guideline items 724 and 730 augment guideline items that will be used in the property repair analysis. On the other hand, the scoping engine finds that neither augmenting guideline items 736 or 742 augment guideline items that will be used. Specifically, no guideline item key was found that matched augmenting item key 740 of augmenting guideline item 736. Therefore, augmenting guideline item 736 is not needed and will be removed. Augmenting item key 746 was found to match item key 738 of augmenting guideline item 736 which is not needed. As a result, the guideline logic of augmenting guideline item 742, if kept, would only augment guideline logic of an unneeded guideline item. Therefore, augmenting guideline item 742 is similarly unneeded and will be removed.

At stage 716, the resulting guideline items include original guideline item 720, augmenting guideline item 724, and augmenting guideline item 730. In the embodiment shown, each of guideline items 720, 724, and 730 remain so that each can be applied to the property repair analysis. Augmenting guideline item 730 augments the guideline logic of augmenting guideline item 724 which, in turn, augments the guideline logic of original guideline item 720.

Figure 8:
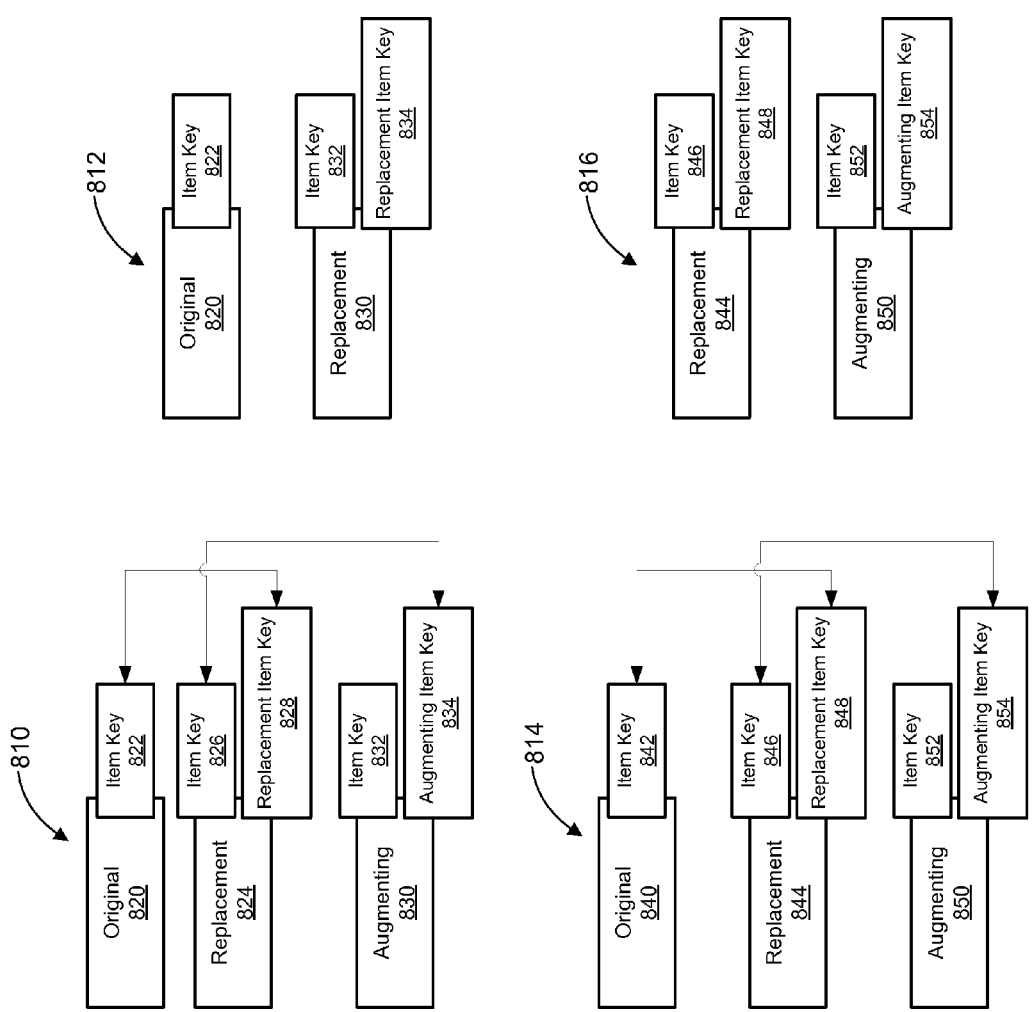

In FIG. 8 is shown an embodiment of combined item augmentation and item replacement. At stage 810 original guideline item 820 with identifying item key 822 is placed in a scoping guideline item set. Replacement guideline item 824, with identifying item key 826 and replacement item key 828, and augmenting guideline item 830, with identifying item key 832 and augmenting item key 834, are also placed in the scoping guideline item set. In this embodiment, augmenting guideline item 824 augments the guideline logic of original guideline item 820. Then, replacement guideline item 830 replaces augmenting guideline item 830. At stage 812 is shown the resulting scoping guideline item set containing original guideline item 820 and replacement guideline item 830.

Also shown in FIG. 8 is an embodiment in which an original guideline item is replaced by a replacement guideline item and then the replacement guideline item is augmented with an augmenting guideline item. At stage 814, original guideline item 840 with identifying item key 842 is replaced by replacement guideline item 844 with identifying item key 846 and replacement item key 848. Again, replacement item key 848 matches identifying item key 842. Then, augmenting guideline item 850 with identifying item key 852 and augmenting item key 854 augments replacement guideline item 844. Here, augmenting item key 854 matches identifying item key 846. At stage 816 is shown the resulting scoping guideline item set which includes replacement guideline item 844 and augmenting guideline item 850.

Figure 9:
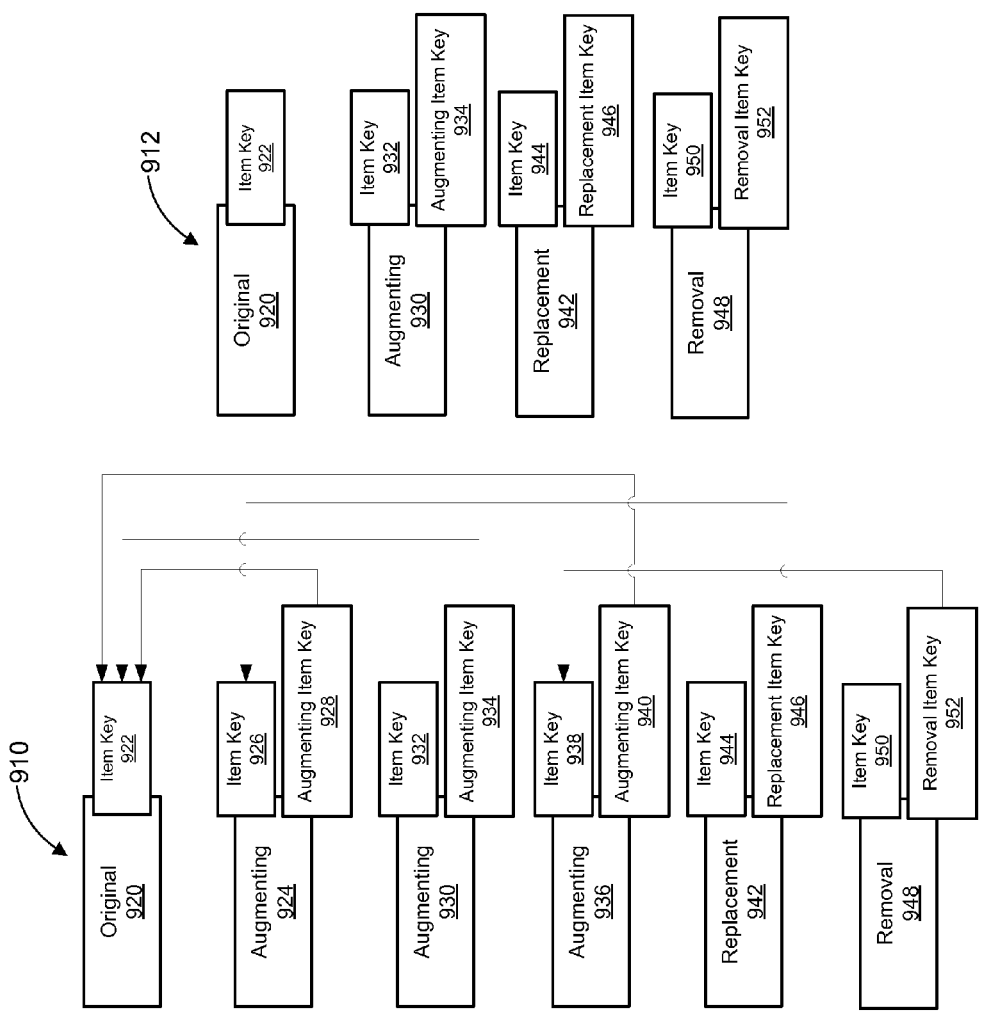

In FIG. 9 is shown an embodiment of advanced chaining. In this example, removal guideline item 948 with identifying item key 950 and removal item key 952 removes augmenting item 936 with identifying item key 938 and augmenting item key 940 when the scoping engines finds that removal item key 952 matches identifying item key 938. Here, the scoping engine also finds that augmenting item key 940 also matches identifying item key 922 of original guideline item 920. However, in the embodiment shown, the removal guideline item 948 takes precedence over augmenting guideline item 936. Therefore, augmenting guideline item 936 is not used to augment original guideline item 920. In other embodiments, augmenting guideline item 936 could be used to augment original guideline item 920 before the scoping guideline items engine applies removal guideline item 948 to remove augmenting guideline item 936.

Replacement guideline item 942 with identifying item key 944 and replacement item key 946 is used to replace augmenting guideline item 924 with identifying item key 926 and augmenting item key 928. Replacement item key 946 matches identifying item key 926. Augmenting guideline item 924 would have been used to augment original guideline item 920 because the scoping engine would find that augmenting item key 928 matches identifying item key 922. However, replacement guideline item 942 takes precedence. In the embodiment shown, replacement guideline item 942 is used to augment original guideline item 920 because it replaced an augmenting guideline item, augmenting guideline item 924 which would have augmented original guideline item 920. In other words, replacement guideline item 942 took the place of augmenting guideline item 924 to augment original guideline item 920. Lastly, augmenting guideline item 930 with identifying item key 932 and augmenting item key 934 is used to augment original guideline item 920 because the scoping engine finds that augmenting item key 934 matches identifying item key 922. Here, no other guideline item has a removal, replacement, or augmenting item key that matches identifying item key 932. The resulting scoping set at stage 912 shows that original guideline item 920, augmenting guideline item 930, replacement guideline item 942, and removal guideline item 948 remain.

Figure 10:
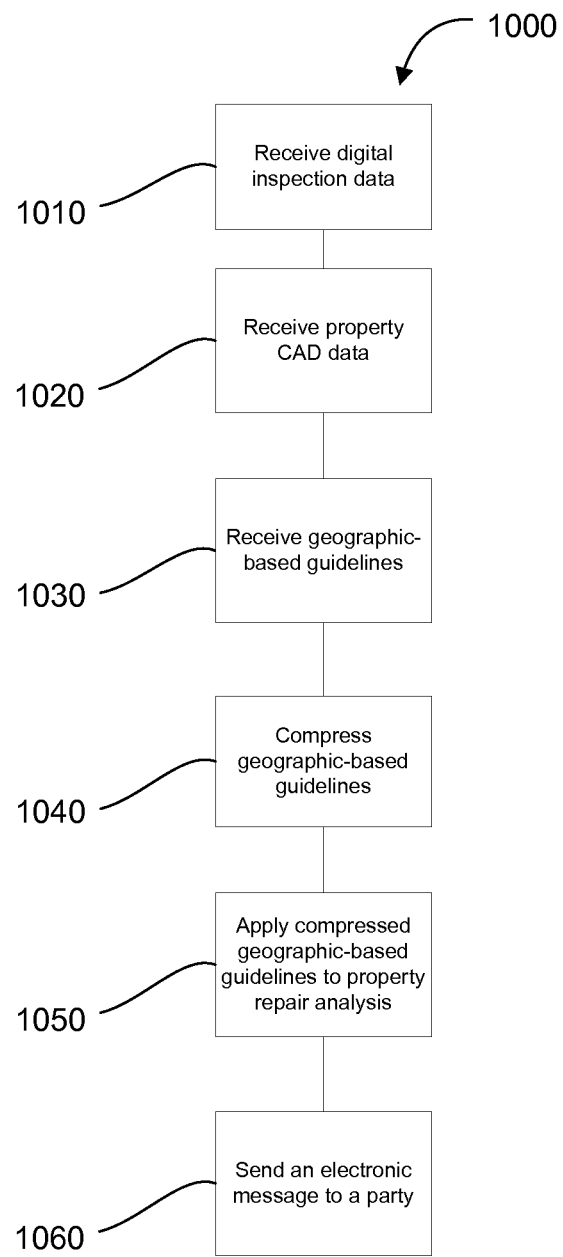
FIG. 10 shows a flowchart of a method for applying digital inspection data, CAD data, and compressed guidelines to a property repair analysis in accordance with illustrative embodiments of the invention

Referring now to FIGS. 10-13, it is to be understood they are not limiting and many of the embodiments illustrated in FIGS. 10-13, can include more or fewer steps and steps illustrated in one embodiment can be included in another embodiment. Referring now specifically to FIG. 10, a method for reconciling property repair analysis guidelines 1000 in accordance with a preferred embodiment is shown. In some embodiments, the digital inspection data and geographic-based guidelines can be received from the same source. In other embodiments, the digital inspection data and geographic-based guidelines can be received from different sources. Further, each of the digital inspection data and the geographic-based guideline data can be received from one or more different sources. Although the embodiment shown in FIG. 10 illustrates a particular order for blocks 1010-1040, the order illustrated in the flowchart is by way of example only and the blocks and/or steps within blocks do not have to be executed in a particular order or at a particular time. In some embodiments, blocks 1010-1040 or a subset thereof can be performed iteratively to include additional digital inspection data and/or guidelines, to perform additional reconciliation, or to send additional messages.

In a preferred embodiment, digital inspection data is received 1010. Digital inspection data can be received 1010 from computing devices at the property site, including portable inspection devices 170 or via another computing device as described above in relation to FIG. 1B. Further, digital inspection data can be received 1010 from multiple sources. For example, digital inspection data can come from a property stakeholder (i.e., a person or entity having an interest in the property), property inspector, or any person or entity that has information about the property. Such information can be consolidated before the digital inspection data is received 1010 or after. Digital inspection data can be stored in memory 135 or storage medium 130.

Digital inspection data can include various forms of information. In some embodiments, digital inspection data can include onsite photos of the property which can be processed so that building facets, materials, damage, and other information conveyed can be recognized. Information from photo recognition can become input into the property repair analysis. Such photo recognition can determine the shape, color pattern, style, some other characteristic, or a combination thereof to determine the material required for the repair or replacement of a particular building facet. For example, particular shingles from a specific manufacture have a particular color, shape, style, and texture pattern. The color, relative or absolute shape, size, position, and dimension of particular aspects of the material, dimension of the material piece, pattern, other characteristics, or a combination of characteristics can be compared to shingle data from a database.

In addition, three-dimensional aspects of the building material can be captured and compared. For example, some clay roofing consists of convex tiles and the curvature of the tile can be captured and used in the comparison. In one embodiment, the onsite photo of a shingle is pixilated, the pixels decomposed, and the pixel pattern is compared against a database of shingle pattern data to determine the proper manufacturer. In other embodiments, details captured from the onsite photo or from other information gathered onsite can be converted to numeric information for comparison. The photo recognition can also be applied to other building materials, including windows, siding, ventilation systems, gutters, and the like. This analysis can be performed as part of the normal property repair analysis or as a separate process. Moreover, building material recognition can be performed on other sources of data, including CAD data that includes building material characteristic image data. Further, a separate system can be used to perform this analysis apart from the property repair analysis, as part of a cost estimation process, or as a method simply to determine the source of building material. Data from the onsite photo, including the photo and any derived data, and the building material information to which it is compared can be stored in building materials database 132.

Digital inspection data can also include geocoding information related to the property. For example, geocoding data can include latitude and longitude or other coordinate data of the property. In some embodiments, such coordinate data can then be converted into zip code, city, county, district, state, and other geocoding information. Geocoding information as part of the digital inspection data can also include address, zip code, district, city, state, and other types of information related to the location of the property. Likewise, such geocoding information can be converted to latitude and longitude or other coordinate data. Moreover, geocoding information can include information about the location of the property, such as altitude, proximity to geographic entities, such as bodies of water, fault lines, and other geographic features relevant to the location of the property. In some embodiments, geocoding information related to the property can be received from another source. For example, geocoding information can be received with property CAD data from an aerial CAD provider or other CAD source. In yet other embodiments, geocoding information related to the property can be received as a separate step from another or similar source. For example, an insurer can maintain geocoding information related to the property.

Referring still to FIG. 2, digital inspection data can be received 1010 directly from an insurance adjuster's portable inspection device 170 or some other computing device or, as described above, through from another, separate computing device and stored in guideline database 134 or, in other embodiments, in memory 135, storage device 130, or similar storage. Further, as mentioned above, digital inspection data can be received from multiple computing devices. For example, some digital inspection data can be received from an insurance adjuster's handheld computer.

Property CAD data is received 1020 and can be stored in memory 135 or storage device 130. In a preferred embodiment, the CAD data received is aerial CAD data of the property. The systems, apparatuses, and methods for receiving CAD are further described in nonprovisional application Ser. No. 13/336,559, entitled "Method and System for Roof Analysis."

Geographic-based guidelines are received 1030 and can be stored in memory 135 or storage device 130. In one embodiment, the scoping engine receives rule information from various sources according to the property location. It then can generate standardized guidelines from those rules and tag them with their source (e.g., state, city, national, etc.). As described above, geographic-based guidelines can include guidelines for any geographic location. For example, guidelines can be national-level, state-level, county-level, city-level, district-level, region-level, zip-code-level, area-code-level, zoning-code-level, and the like. Geographic locations can be based on geographic regions (e.g., Pacific Northwest Region, Piedmont Region, etc.) or political regions (e.g., city, zoning area, etc.) Further, geographic locations can be based on other location characteristics such as altitude, proximity to floodplains, frequency of hail, tornados or other storm events, and the like. Geographic locations can also be combinations of the foregoing (e.g., Virginia Piedmont Region areas within two miles of a floodplain, San Mateo County within one and a half miles of the San Andreas Fault, etc.). Those of skill in the art can appreciate the spectrum of geographic locations and the combinations of geographic locations that can be useful as a basis for property repair analysis guidelines.

In one embodiment, geographic-based guidelines can be received 1030 from multiple sources. For example, guideline data can be received from an insurance carrier database, a local government that maintains building codes, an international building code database, a database of guidelines for the repair or replacement of particular building material, and the like. It is to be understood that geographic-based guidelines can be received 1030 on a regular basis at intervals, when guideline data is updated, or when a property repair analysis is performed and guideline data is required.

The geographic-based are compressed 1040. In various embodiments, guidelines can be compressed as discussed above in connection with FIGS. 2-9. The compressed geographic-based guidelines are applied to a property repair analysis 1050. In one embodiment, the system renders repair and replace decisions to a property based on the digital inspection data, property CAD data, and the geographic-based guidelines. In another embodiment, the geographic-based guidelines can be executed against property CAD data alone or the digital inspection data alone. For example, if digital inspection data provides information that does not relate to any of the property CAD data, the property repair analysis may take only the digital inspection data and applicable guidelines into account. If property CAD data provides information that does not relate to any of the digital inspection data, the property repair analysis may take only the property CAD data and the applicable guidelines into account. Systems and methods for performing property repair analysis are more fully discussed in nonprovisional application Ser. No. 13/336,559, entitled "Method and System for Roof Analysis," which is incorporated herein in its entirety.

As part of the property repair analysis, repair or replacement decisions can be based on a peril specific variable. A peril specific variable enables a likelihood of damage factor to be set that a repair or a replacement decision would be triggered by the peril. It can be based on the building facet, the building facet material, the damage-causing event, and other factors relevant to indicating whether a building facet might have to be repaired or replaced. For example, a steel exhaust vent would rarely be damaged by hail. Accordingly, the "replace steel exhaust vent" variable would be set to low when the damage-causing event was a hail storm, the insurance claim was for hail damage, or both. The material type that goes into the determination can be obtained, for example, from the photo recognition as described above, from other digital inspection data, CAD data, and the like. During or after the property repair analysis, the scope of repair and replace items can be analyzed based on one or more likelihood of damage factors that each item has for the peril specific variable. As part of the process, if items are tagged with repair or replace because of their directionality and the damage type, for example, and those items are tagged with low likelihood of damage factors because, for example their material and the damage type or damage causing event, the claim can be flagged for review. This may prevent the unnecessary approval of a repair or replacement for the building or a subset of building facets.

An electronic message is sent to a party 1060. In one embodiment, a system user can be presented with an indicator that a building facet is to be replaced or repaired based on the compressed geographic-based guidelines applied to the property repair analysis 1050. For example, a building facet can be coded in a CAD image of the property as described in nonprovisional application Ser. No. 13/336,559, entitled "Method and System for Roof Analysis." In another embodiment, an electronic message can be sent to an insurer regarding the repair analysis. For example, the insurer can be provided with details about the material required (e.g., type, amount, manufacturer, supplier, etc.), the estimated material waste, an estimated cost of repair or replacement (e.g., material cost, supplier prices, contractor estimates, etc.), information about the guidelines applied, information about the property CAD data, information about the digital inspection data, and the like.

In yet another embodiment, the insured, the insurance adjuster, contractor, property inspector, governmental agency, or other stakeholder can be provided with the same or similar information. For example, property owners can receive information about the extent of property repair cost, governmental agencies can receive information about multiple properties having been analyzed, and property inspectors can receive information property repair and replacement that must be inspected. Those of skill in the art can appreciate that the information aggregated and generated can be presented in varying levels of detail to multiple stakeholders.

The electronic message can include XML, CSV, or other types of flat-file data or other types of common or proprietary formatted information for input into other systems. For example, insurance adjusters may accept the sent message as an XML file to be displayed as a form on the portable inspection device 170. In another embodiment, the message can be sent as a pre-formatted PDF file to an insurance carrier for storage in the insurance carrier's records system or to a property owner for the owner's personal records. Those of skill in the art can appreciate that the generated information related to the property repair analysis can be useful to a number of stakeholders, each with its own requirements and uses for the information. Accordingly, the information related to the outcome of the property repair analysis can be formatted in a number of different ways for transmission to a number of different stakeholders for a number of different uses.

Figure 11:
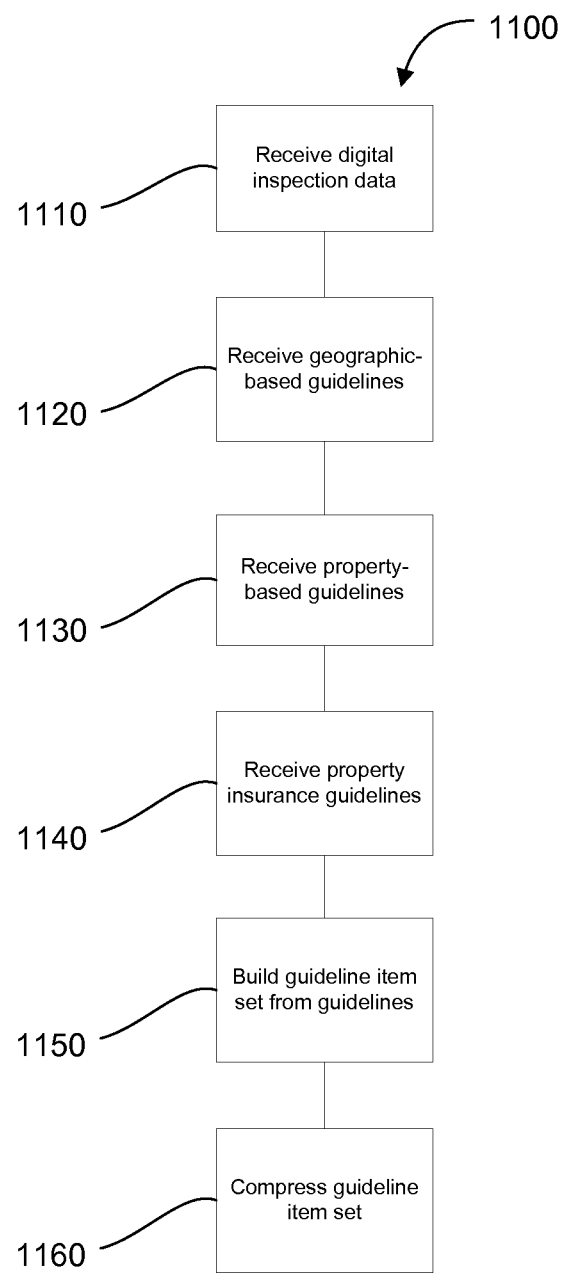
FIG. 11 shows a flowchart of a method for compressing guidelines in accordance with illustrative embodiments of the invention.

Referring now to FIG. 11, illustrated is an embodiment of a method for determining the guidelines to be applied to a property repair analysis 1100. Digital inspection data is received 1110 as described above. Also, geographic-based guidelines are received 1120 as described above. Further, property-based guidelines are received 1130, similar to the geographic-based guidlines. In a preferred embodiment, property-based guidelines can be guidelines that govern the repair or replacement of particular types of property (e.g., commercial buildings, residential buildings, residential or commercial out-buildings, schools, non-habitable structures, and the like), particular types of building materials (e.g., fiberglass roofing, steel roofing, clay roofing, aluminum siding, wood siding, and the like), and other types of property characteristics.

Property insurance guidelines can be received 1140, similar to the geographic-based guidelines. Such guidelines can be based on the type of insurance coverage the property owner or other stakeholder has for the property to be analyzed. For example, the property owner may have a specific type of coverage that allows for full replacement if damage estimates rise above a predetermined limit. The property owner can have a specific type of coverage that precludes or requires particular types of repairs. Those of skill in the art can appreciate that insurance policies and insurers offer different levels of coverage that determine the results of a property repair analysis. A guideline item set is built from the guidelines received 1150 as described above in connection to FIGS. 2-9 and the guideline item set is compressed 1160 as described above in connection with FIGS. 2-9.

Figure 12:
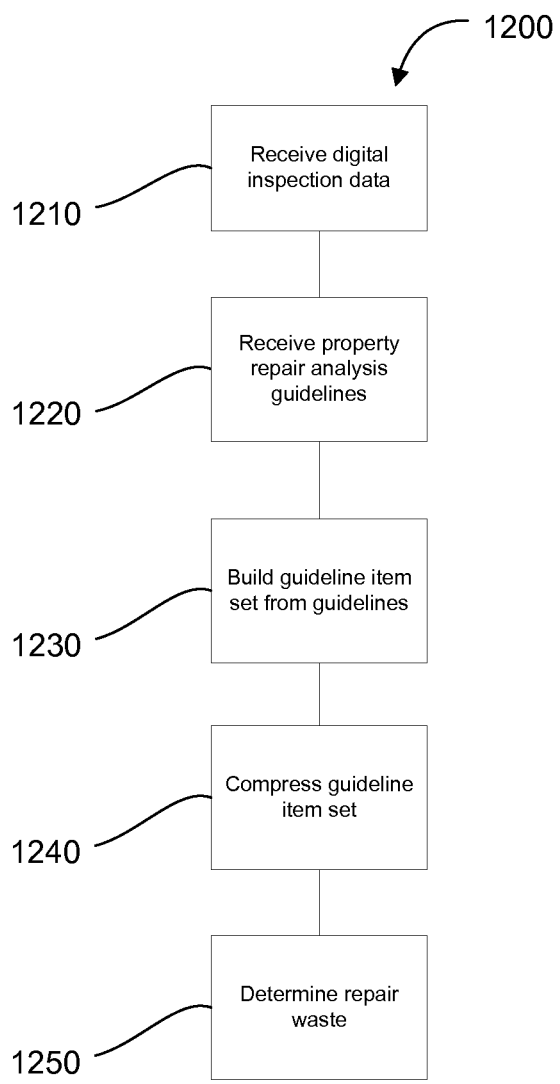
FIG. 12 shows a flowchart of a method for determining repair waste requirements using compressed guidelines in accordance with illustrative embodiments of the invention.

Referring now to FIG. 12, an embodiment of a method to determine property repair waste 1200 is shown. Digital inspection data is received 1210 and property repair analysis guidelines are received 1220 as described above, property repair analysis guidelines generally referring to guidelines of any of the types described above. The guideline item set is built from the guidelines 1230 and the guidelines are compressed 1240.

The waste from the property repair as determined from the digital inspection data and the compressed guidelines is determined 1250. In a preferred embodiment, the amount of waste material from a property repair is calculated from the amount of material required for the repair and the area of the building facets to be repaired. The volume, weight, and other measurements of the waste material can be used to determine the size of dumpsters required at the repair site. Each repair or replace item can be assigned a "haul away factor" which is used in determining waste disposal storage or recycling storage requirements. The amount of material (e.g., weight, number, etc.) can be multiplied or otherwise modified by the "haul away factor" to determine the storage requirements. Moreover, waste material measurements can be used to refine the property repair analysis. For example, if the area of waste material rises above a predetermined threshold (e.g., ten percent of the total building material used) the parameters (e.g., guidelines, digital inspection data, aerial CAD data, building material supplier information etc.) of the property repair analysis can be refined and the property repair analysis can be repeated.

In another embodiment, waste material can include recyclable material and the amount of recyclable material can be determined as part of determining repair waste 1250. In other embodiments determining recyclable material can be a separate step or can replace determining repair waste 1250. Jurisdictions can require that a predetermined amount of unused building material after a property repair be recyclable. For example, some jurisdictions can require that all of certain types of building material be 100% recyclable so that all of the waste can be recycled rather than be placed in a waste dumpster. Further, in some jurisdictions, predetermined amounts of particular types of building material must be recycled. For example, a jurisdiction may require that ten percent of all siding and roofing waste be recycled or that fifteen percent of all replaced or waste siding and roofing be recycled. One advantage of the present invention is the cost efficiency maximization not only of building materials order, delivered, and used, but of building materials wasted vs. recycled and of building material waste and recycling dumpster delivered and used. Dumpsters often must be rented and incur delivery and destination fees. Consequently, the accurate determination of the amount of building materials required for the repair, building material wasted, and building material recycled greatly reduces the overhead cost of dumpster use.

Determining repair waste 1250 can also include indicating any building materials required for the repair to be recycled. For example, contractors often do not understand which of the materials they use can be recycled. In some embodiments, contractors can be provided information about which of the building materials are recyclable along with how much they should anticipate to recycle. For example, a contractor, upon beginning a repair job, can be provided with an inventory of the building materials to be used, the amount of each building material required for the repair, an estimate of the amount of waste of each building material, which building material can be recycled, and any jurisdictional recycling requirements. As a result, the contractor can separate the recyclable building material waste from the non-recyclable at the job site. And because the number and size of dumpsters is minimized, the cost of disposing of building material waste also is minimized.

Figure 13:
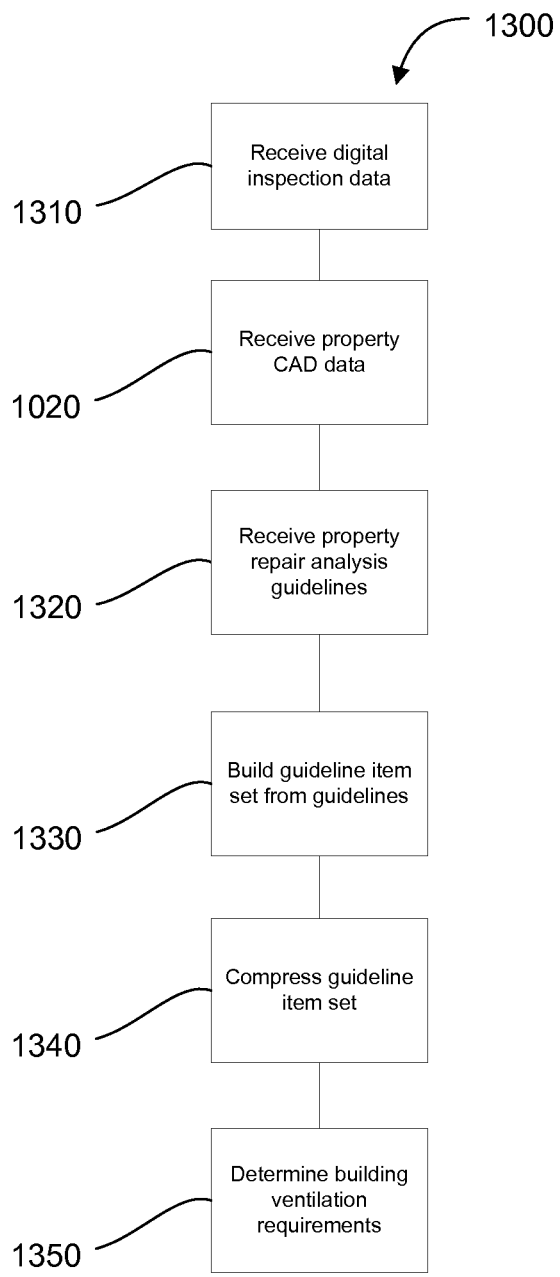
FIG. 13 shows a flowchart of a method for determining building ventilation repair requirements based on compressed guidelines in accordance with illustrative embodiments of the invention.

Referring now to FIG. 13, a method for determining roofing ventilation repair requirements 1300 is illustrated. Digital inspection data is received 1310. In one embodiment, an adjuster can gather information about a property for the repair analysis and transmit it, via property inspection device 170 to server 190. Digital inspection data can include onsite photos as described above, including photos of roof areas, roof vents, soffits, and other roofing properties relevant to an analysis of roof ventilation.

Property CAD data can be received 1320 and can be stored in memory 135 or storage device 130. Property CAD data can include aerial CAD data which provides roof dimensions. Property repair analysis guidelines can be received 1320 and a guideline item set can be built 1330 and compressed 1340 as described above in connection with FIGS. 10-12.

Building ventilation requirements can be determined 1350 from the digital inspection data, property CAD data, and guidelines. Current industry standards require that the amount of attic ventilation to be installed on a roof is based on a 1:150 to 1:600 ratio (in square inches) of attic ventilation to attic floor area. Each vent type has an opening area to allow air to move through. Each soffit vent at the roofs eave edge also has an opening for air to move through. According to industry standards, the quantity of openings that allow air to flow into the soffits, through the attic, and out the roof vents should be balanced. In one embodiment, as part of determining the building ventilation requirements 1350, the sufficiency of the current ventilation, based on current industry standards or future changes to standards, can be determined and additional ventilation can be recommended. This determination can be based on the digital inspection data and aerial CAD data. For example, dimensions of current ventilation, roofing, and soffits can be calculated from the digital inspection data. The calculation can be made by estimating the respective areas after processing one or more onsite photos or other digital inspection data and comparing them against aerial CAD of the roof from which the roofing area can be calculated and attic area can be determined or estimated.

Digital inspection data can also include heat measurements from the attic space. In the winter, heat radiates from the interior of the property through the attic and, in the summer, heat radiates from the sun through the roofing material into the attic. Onsite measurements of attic heat can be taken by an adjuster, for example, and transmitted from inspection device 170 or otherwise as described above. Ventilation ratios can be calculated based on the heat measurement. Furthermore, ventilation ratio can be determined from the attic volume gathered and transmitted which would indicate the amount of air that should be vented.

In conclusion, the present invention provides, among other things, a system and method for intelligently setting building facet directionality and estimating a quantity of building material with waste associated with a building facet repair, replacement, or both. Additionally, it provides a system and method for using aerial CAD data, insurance and building code guidelines, weather data, and inspection data for intelligently making repair decisions for building facets. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for property repair analysis, comprising:
receiving, by an at least one network communications interface of a computer, digital inspection data of a building facet of a property;
receiving, by the at least one network communications interface of the computer, a first layer of geographic-based guideline data, the first layer including a plurality of guideline data items;
receiving, by the at least one network communications interface of the computer, a second layer of geographic-based guideline data;
compressing the first layer of geographic-based guideline data and the second layer of geographic-based guideline data;
during the compressing, determining that a first conflict exists between a first guideline data item of the first layer of geographic-based guideline data and a first guideline data item of the second layer of geographic-based guideline data;
reconciling the first conflict to generate a resulting guideline data item, wherein reconciling the first conflict comprises:
determining that the first layer of geographic-based guideline data is more local as compared to the second layer of geographic-based guideline data; and
based on determining that the first layer of geographic-based guideline data is more local as compared to the second layer of geographic-based guideline data, selecting the first guideline data item of the first layer of geographic-based guideline data over the first guideline data item of the second layer of geographic-based guideline data to be included in the resulting guideline data item;
determining a repair indicator for the building facet based at least in part on the resulting guideline data item and the digital inspection data; and
sending, using the at least one network communications interface of the computer, an electronic message, the electronic message including at least a portion of the digital inspection data and the repair indicator.

2. The method of claim 1, further comprising:
reconciling a second conflict between a second guideline data item of the first layer of geographic-based guideline data and a second guideline data item of the second layer of geographic-based guideline data, wherein the reconciling the second conflict is based at least in part on one or more of property type, material type, and rule or guideline strictness.

3. The method of claim 2, wherein the first layer of geographic-based guideline data comprises local building codes, wherein the second layer of geographic-based guideline data comprises insurer guidelines, and wherein the first layer of geographic-based guideline data takes precedence over the second layer of geographic-based guideline data.

4. The method of claim 1, wherein the first layer of digital guideline data includes guideline data items selected from a group comprising:
building code guideline data, insurance carrier guideline data, property-specific guideline data, and building facet-specific guideline data.

5. The method of claim 4, wherein the building code guideline data is selected from a group comprising:
local building code data and international building code data.

6. The method of claim 1, wherein the reconciling the first conflict is based at least in part on a time.

7. The method of claim 1, further comprising:
receiving, by the at least one network communications interface of the computer, geocoding data related to the property; and
wherein the receiving the second layer of geographic-based guideline data is based at least in part on the geocoding data.

8. The method of claim 1, further comprising:
receiving, by the at least one network communications interface of the computer, aerial computer-aided design data related to the building facet.

9. The method of claim 1, further comprising:
receiving, by the at least one network communications interface of the computer, digital geospatial data related to the property; and
wherein the determining the repair indicator for the building facet is based at least in part on the digital geospatial data.

10. The method of claim 1, further comprising:
determining an amount of building material required to repair damage to an area of the building facet, including determining an amount of waste building material, wherein determining the repair indicator for the building facet is also based at least in part upon the determined amount of waste building material.

11. A non-transitory computer-readable storage medium containing a plurality of program instructions executable by a processor of a computer for property repair analysis, the plurality of program instructions comprising:
a first set of instructions configured to cause the computer to receive digital inspection data of a building facet of a property;
a second set of instructions configured to cause the computer to receive a first layer of geographic-based guideline data, the first layer including a plurality of guideline data items;
a third set of instructions configured to cause the computer to receive, using the at least one network communication interface, a second layer of geographic-based guideline data;

a fourth set of instructions configured to compress the first layer of geographic-based guideline data and the second layer of geographic-based guideline data and during such compression determine that a first conflict exists between a first guideline data item of the first layer of geographic-based guideline data and a first guideline data item of the second layer of geographic-based guideline data;

a fifth set of instructions configured to cause the computer to reconcile, using the at least one processor, the first conflict to generate a resulting guideline data item, wherein the first conflict is reconciled by determining that the first layer of geographic-based guideline data is more local as compared to the second layer of geographic-based guideline data and then the first guideline data item of the first layer of geographic-based guideline data is selected over the first guideline data item of the second layer of geographic-based guideline data to be included in the resulting guideline data item;

a sixth set of instructions configured to cause the computer to determine, using the at least one processor, a repair indicator for the building facet based at least in part on the resulting guideline data item and the digital inspection data; and a seventh set of instructions configured to cause the computer to send, using the at least one network communication interface, an electronic message, electronic message including at least a portion of the digital inspection data and the repair indicator.

12. The non-transitory computer-readable storage medium of claim 11, wherein the plurality of instructions further comprises:
an eighth set of instructions configured to cause the computer to reconcile, using the processor of the computer, a second conflict between a second guideline data item of the first layer of geographic-based guideline data and a second guideline data item of the second layer of geographic-based guideline data, wherein the reconciling the second conflict is based at least in part on one or more of property type, material type, and rule or guideline strictness.

13. The non-transitory computer-readable storage medium of claim 12, wherein the first layer of geographic-based guideline data comprises local building codes, wherein the second layer of geographic-based guideline data comprises insurer guidelines, and wherein the first layer of geographic-based guideline data takes precedence over the second layer of geographic-based guideline data.

14. The non-transitory computer-readable storage medium of claim 11, wherein the first layer of digital guideline data includes guideline data items selected from a group comprising:
building code guideline data, insurance carrier guideline data, property-specific guideline data, and building facet-specific guideline data.

15. The non-transitory computer-readable storage medium of claim 14, wherein the building code guideline data is selected from a group comprising:
local building code data and international building code data.

16. The non-transitory computer-readable storage medium of claim 11, wherein the fifth set of instructions configured to cause the computer to reconcile the first conflict bases the reconciliation at least in part on a time.

17. The non-transitory computer-readable storage medium of claim 11, wherein the plurality of instructions further comprises:
an eighth set of instructions configured to cause the computer to receive geocoding data related to the property; and
wherein the third set of instructions configured to cause the computer to receive the second layer of geographic-based guideline data bases the reception at least in part on the geocoding data.

18. The non-transitory computer-readable storage medium of claim 11, wherein the plurality of instructions further comprises:
an eighth set of instructions configured to cause the computer to receive aerial computer-aided design data related to the building facet.

19. The non-transitory computer-readable storage medium of claim 11, wherein the plurality of instructions further comprises:
an eighth set of instructions configured to cause the computer to receive digital geospatial data related to the property; and
wherein the sixth set of instructions configured to cause the computer to determine the repair indicator for the building facet bases the determination at least in part on the digital geospatial data.

20. A system for property repair analysis, comprising:
at least one processor;
at least one network communications interface;
a memory containing a plurality of instructions configured to cause the at least one processor to:
receive, using the at least one network communications interface, digital inspection data of a building facet of a property;
receive, using the at least one network communications interface, a first layer of geographic-based guideline data, the first layer including a plurality of guideline data items;
receive, using the at least one network communication interface, a second layer of geographic-based guideline data;
compress the first layer of geographic-based guideline data and the second layer of geographic-based guideline data and determine during the compression that a first conflict exists between a first guideline data item of the first layer of geographic-based guideline data and a first guideline data item of the second layer of geographic-based guideline data;
reconcile, using the at least one processor, the first conflict to generate a resulting guideline data item, wherein the first conflict is reconciled by determining that the first layer of geographic-based guideline data is more local as compared to the second layer of geographic-based guideline data and then the first guideline data item of the first layer of geographic-based guideline data is selected over the first guideline data item of the second layer of geographic-based guideline data to be included in the resulting guideline data item;
determine, using the at least one processor, a repair indicator for the building facet based at least in part on the resulting guideline data item and the digital inspection data; and
send, using the at least one network communications interface, an electronic message, the electronic message including at least a portion of the digital inspection data and the repair indicator.

* * * * *